United States Patent Office 3,106,470
Patented Oct. 8, 1963

3,106,470
PRESSURE ROASTING OF COFFEE
Clifford H. Spotholz, Montvale, N.J., assignor to General Foods Corporation, White Plains, N.Y., a corporation of Delaware
No Drawing. Filed June 6, 1962, Ser. No. 200,331
3 Claims. (Cl. 99—68)

This invention relates to the roasting of whole green coffee beans under conditions of relatively high pressures and short roasting times. It particularly relates to the production of roasted coffee having a high soluble solids content so as to be suitable not only for making regular brews but also for making soluble coffee, that is, coffee powder which dissolves instantly on the addition of hot water.

While many varieties of beans produce satisfactory results when prepared by a two-part roasting cycle, it has been found that for many varieties of beans, it is desirable to subject the roasted beans to a post-heating step to obtain the most desirable characteristics for use in blending with other varieties of coffee.

A process for roasting whole green coffee beans at an increased rate in a roasting cycle comprising a preheating period and a roasting period has previously been disclosed. The roasting period is particularly characterized by the use of the highest temperatures and pressures in the cycle and by the fact that the moisture content is the highest during the cycle. Whole green beans are charged to a preheating zone and preheated to a bean temperature of, say 240° to 390° F. for a time of 1 to 3 minutes and at substantially atmospheric pressure, after which the beans in the heated state are fed to a roasting chamber and heated to a bean temperature of 370° to 550° F. at a pressure of 190 to 1030 p.s.i.g. for a time of about 0.3 to 2 minutes. These conditions will vary somewhat depending on the bean variety, the desired roast characteristics and whether the steam is saturated or superheated. Then the pressure on the beans in the chamber is suddenly released and coincidently therewith the beans are cooled to stop the roasting reaction by discharging the contents of the chamber into an expansion zone where the beans are collected. There is recovered as product roasted beans having a soluble solids content of about 30% to 40% by weight, such product having a soluble solids content substantially higher than conventionally roasted beans. The soluble solids content by weight of such product may be in the order of 10% to 50% higher than that of conventionally roasted coffee.

It has now been discovered that for certain varieties of coffee a three-part roasting cycle should be employed, it being desirable to subject the beans resulting from the roasting step of a two-cycle process to post-heating where the beans are heated at substantially atmospheric pressure for a time of about 1 to 5 minutes, thereby effecting a flavor change; e.g. reducing their acidity, and then quickly cooling the beans.

Considering the invention in detail, it is applicable to the roasting of coffee generally. More particularly, the process is applicable to attainment of maximum puffing during roasting of coffee beans where there is usually a wide variation in the degree of puff obtained in conventional roasting. Not only are the bean flavor and the acidity improved in the case of many varieties of coffee, but in addition the roasting rate is substantially increased over that of conventional production roasting. Furthermore, the soluble solids content and cup strength of coffee beans treated by the invention are increased.

Blends of coffees may also be improved by comparison with the products of conventional roasting.

In some instances, the acidity of the resulting brew may be higher than is desirable, and in these instances it is desirable to subject the roasted beans to a post-heating treatment. In other words, while the steps of preheating and roasting may, in the cases noted, produce a fair cup of coffee, the additional step of post-heating will provide a good cup. In order to post-heat, the roasted beans are transferred to a conventional roaster comprising a rotatable perforated drum roaster provided with stirring means. The beans are tumbled with the roasting cylinder while hot air at a temperature in the range of 400°–600° F. together with the combustion gases, are circulated through the beans by a blower so as to make direct contact with the beans. The time of heating may be 2 to 4 minutes, and the pressure is atmospheric. The heating gas is carried off through a stack after contacting the beans. At the end of such heating period the beans are quickly cooled in a conventional way and removed from the roaster.

The moisture content of the beans during the over-all process is a consideration of importance. Initially, that is, before processing, the moisture content of the beans may be that of conventional green beans, say from 5% to 15% by weight. No extended green bean dehydration step is required.

In the roasting part of the cycle, that is in the pressure chamber, it is desirable to have a relatively high moisture level to favor the production of soluble solids, and this aim is fulfilled by roasting with steam. At the same time, the moisture level should not be excessively high as otherwise the roasted product may tend to be wet, spongy, and give a brew having an under-roasted flavor and an excessive acidity.

The moisture level in the roasting step may be controlled to an extent in the preheating step by regulating the preheating temperature and time, and by maintaining a certain degree of superheat or a certain quality in the steam being injected into the roasting chamber. In other words, the more superheat in the steam, the less water will be added to the bean mixture at a particular steam pressure, and vice versa. The moisture level in the chamber may also be controlled to an extent by choosing green beans of different moisture levels.

Among the characteristics of the roasted product, the roasted bean size is noteworthy, it having been found that the size is significantly greater than that obtained by conventional roasting. Thus, it is possible that the increased size or expansion of the bean may result in a more rapid rate of soluble solids extraction and thereby permit the use of milder extraction conditions with a resulting flavor quality improvement and savings in the cost of processing. The product breaks much more easily between the fingers and the density will vary from 0.3 to 0.4 gm./ml.

The acidity of a brew made from coffee roasted according to the invention is increased over conventional brews. Also, cup solids are consistently higher, and cup strengths are improved. In addition, the present method produces roasted coffee having a definitely higher titratable acidity.

The invention may be illustrated by the following examples:

EXAMPLE I

A quantity of coffee beans roasted in a two-cycle process were post-heated to effect a 3-stage roasting cycle, the pertinent data of which is set forth as follows.

Table 1

Green bean:
- Charge, lbs _____ 15
- Moisture, percent _____ 11.8
- Density, gm./ml _____ 0.72

Preheating conditions:
- Temperature, °F _____ 380–410
- Time, minutes _____ 3
- Moisture, percent after preheating _____ 6–7

Roasting conditions:
- Steam temperature, °F _____ 525–540
- Steam pressure, p.s.i.g. (superheated) __ 190–210
- Chamber pressure, p.s.i.g _____ 200
- Chamber temperature, °F _____ 380–385
- Chamber time, minutes _____ 1.75

Roasted bean characteristics:
- Moisture, percent _____ 6.4
- Density, gm./ml _____ 0.34
- Soluble solids, percent _____ 34.7

Post heating conditions:
- Temperature, °F _____ 400–600
- Time, minutes _____ 5

Post heating bean characteristics:
- Moisture, percent _____ 1.8
- Density, gm./ml _____ 0.33
- Soluble solids, percent _____ 34.0

A 1-lb. charge of beans was also roasted conventionally using a temperature of 500°–600° F. and a heating time of approximately 12 minutes. The roasted, air quenched product had a moisture content of approximately 3% by weight and a soluble solids content of 26% by weight. As is apparent, the soluble solids content of the beans roasted by the present method was about 30% higher than that of the conventionally roasted beans.

EXAMPLE II

A 14-lb. blend of coffee was roasted by the present method and compared with a 1-lb. product obtained by conventional roasting. The blend, comprising whole green beans, consisted of 40% Armenia beans, 40% Santos beans and 20% Ambriz beans on a weight basis. The preheating, roasting (with saturated steam), and postheating conditions are set forth in the table below together with certain properties of the roasted product and the post-heated or final product. Three different runs were made. The conventional roasting method was the same as that described in Example I.

Table 2

|  | Run No. 1 | Run No. 2 | Run No. 3 |
|---|---|---|---|
| Preheat Conditions: |  |  |  |
| Temp., °F | 400 | 400 | 400 |
| Time, Minutes | 1.0 | 1.0 | 1.0 |
| Moisture, percent after preheating | 4.0 | 4.0 | 4.0 |
| Roast Conditions: |  |  |  |
| Pressure, p.s.i.g | 250 | 250 | 250 |
| Temp., °F (calculated) | 401 | 401 | 401 |
| Time, Minutes | 1.0 | 1.25 | 1.5 |
| Roasted Product Characteristics: |  |  |  |
| Soluble Solids, Percent | 32.2 | 35.6 | 37.1 |
| pH of Brew | 4.7 | 4.65 | 4.6 |
| Post Heating Conditions: |  |  |  |
| Temp., °F | 500 | 500 | 500 |
| Time, Minutes | 4.0 | 2.5 | 2.0 |
| Final Product Characteristics: |  |  |  |
| Soluble Solids, Percent | 29.7 | 31.7 | 35.7 |
| pH of Brew | 4.90 | 5.03 | 4.75 |

The pH of the final product brew from run No. 1 is the same as that of a good commercial cup of coffee. With respect to flavor quality, the brews from Nos. 1 and 2 were superior to No. 3. The brews from Nos. 2 and 3 had the highest cup strength. The final product obtained by conventional roasting had a soluble solids content of 27.4%, a brew pH of 5.10, a flavor quality on a par with that from run No. 1, and a cup strength not quite as high as that from runs Nos. 2 and 3. Over-all, the brew from No. 2 was most preferred. As may be apparent, the soluble solids content of the roasted coffee decreases as a result of the post-roasting step. It may be noted that the product from run No. 1 had a soluble solids content 8.4% greater than conventional; that from run No. 2 was 15.7% greater than conventional; and run No. 3 had a 30.3% greater soluble solids content than conventional.

The moisture content in percent by weight was determined by drying a weighed sample of the coffee overnight in an air oven maintained at 105° C., then cooling the sample and re-weighing. Soluble solids in percent by weight were determined by weighing a ground coffee sample, adding it to water and heating under refluxing conditions, cooling the extract, and then centrifuging it, removing the water from the extract in a steam bath, drying the extract in a vacuum oven, cooling and weighing the resulting sample. The pH was measured by a Beckman pH meter.

As illustrated by Example II, coffee based on an Armenia-Santos-Ambriz blend, when roasted by the method of this invention, will have a soluble solids content greater than that of an identical blend that has been conventionally roasted; at the same time, the first-noted blend will have a flavor quality at least equal to the conventionally roasted blend.

The present application is a continuation-in-part of Serial No. 42,242, filed July 12, 1960, now abandoned.

The invention is not restricted to the specific details above set forth, but is capable of obvious variations thereof without departing from its scope.

What is claimed is:

1. Process for roasting whole green coffee beans at an increased rate in a three-part roasting cycle comprising a preheating period, a roasting period, and a post-heating period, said preheating period occurring over the first ¼ to ⅓ part of said cycle, said roasting period occurring over the next ¼ part, and said post-heating period taking place over the remainder of said cycle, said roasting period being characterized by the use of the highest temperatures and pressures in said cycle and by the fact that the moisture content is highest during said period, said cycle requiring about 4 to 9 minutes; which comprises charging whole green beans to a preheating zone, passing through the charge of beans heated air at a temperature of 380° F. to 410° F. and at substantially atmospheric pressure to preheat the beans to a bean temperature of 240° F.–390° F.; feeding the beans to a roasting chamber and introducing thereto steam at a temperature of 370° F. to 600° F. and a pressure of about 200–250 p.s.i.g. to heat the beans in said chamber to a temperature of 370° F. to 550° F., thereby to roast the beans, then suddenly releasing the pressure in said chamber and coincidently therewith cooling said beans by discharging the contents of said chamber into an expansion zone where the beans are collected, then removing the roasted beans to a heated post-heating zone and heating the same therein at substantially atmospheric pressure by passing therethrough hot gas maintained at a temperature of about 400° F. to 600° F., thereby to reduce the acidity of the roasted beans, then quickly terminating the heating by cooling the beans; and recovering as a product roasted beans having a soluble solids content of about 30 to 40% by weight, said roasted product having a soluble solids content of up to 10–50% by weight higher than conventionally roasted beans.

2. Process for roasting whole green coffee beans at an increased rate in a three-part roasting cycle comprising a preheating period, a roasting period, and a post-heating period, said roasting period being characterized by the application of the highest temperatures in said cycle and by the fact that the moisture content is highest during said period, which comprises charging whole green beans to a preheating zone, passing through the charge of beans heated air at a temperature of 380° F. to 410° F. for a time of about 1 to 3 minutes and at substantially atmospheric pressure to preheat the beans; feeding the beans to a roasting chamber and introducing thereto superheated steam at a temperature of 370° F. to 600° F. and a pressure of about 200-250 p.s.i.g. to heat the beans in said chamber to a temperature of 370° F. to 550° F., maintaining the beans in said chamber and in contact with said steam for a time of about 1 to 2 minutes, thereby to roast the beans, then suddenly releasing the pressure in said chamber and coincidently therewith cooling said beans by discharging the contents of said chamber into an expansion zone where the beans are collected and gaseous material is separated and removed, thereby obtaining roasted beans, then removing the roasted beans to a heated post-heating zone and heating the same therein at substantially atmospheric pressure by passing therethrough for a time of about 2 to 4 minutes a gas maintained at a temperature of about 400° F. to 600° F., then quickly terminating the roasting by cooling the beans, and recovering as a product roasted beans having a soluble solids content of about 30 to 36% by weight, said roasted product having a soluble solids content of up to 10-50% by weight higher than conventionally roasted beans.

3. Process for roasting whole, green coffee beans at an increased rate in a three-part roasting cycle comprising a preheating period, a roasting period, and a post-heating period, said roasting period being characterized by the application of the highest temperatures and pressures in said cycle and by the fact that the moisture content is higher than in said other periods; which comprises charging whole green beans having a moisture content of 5 to 15% by weight to a preheating zone; passing through the charge of beans heated air at a temperature of 380° F. to 410° F. for a time of about 1 to 3 minutes and at substantially atmospheric pressure to preheat the beans to a bean temperature of 375° F., said preheated beans having a reduced moisture content in the range of 3 to 10% by weight; feeding the beans to a roasting chamber and introducing thereto superheated steam at a temperature of 390° F. to 550° F. and a pressure of about 200-250 p.s.i.g. to heat the beans in said chamber to a temperature of 380° F. to 405° F., maintaining the beans in said chamber and in contact with said steam for a time of about 1 to 2 minutes, thereby to roast the beans, then suddenly releasing the pressure in said chamber and coincidently therewith cooling said beans by discharging the contents of said chamber into an expansion zone where the beans are collected and gaseous material is separated and removed, thereby obtaining roasted beans having a soluble solids content of about 32 to 36% by weight, then removing the roasted beans to a heated post-heating zone and heating the same therein at substantially atmospheric pressure by passing therethrough for a time of about 2 to 4 minutes a hot gas maintained at a tempertaure of about 400° F. to 600° F., then quickly terminating the heating by cooling the beans, and recovering as a product roasted beans having a soluble solids content of about 30 to 36% by weight, said roasted beans producing a brew having a pH of about 4.75 to 5.03, said roasted product having a soluble solids content of up to 20% by weight higher than conventionally roasted beans and also having a larger roast bean size; said roasted product producing a brew which, by comparison with a brew from conventionally roasted beans, has an increased cup solids content of 3 to 15% by weight greater, a correspondingly improved cup strength, a more acid pH, and at least a comparable flavor quality.

References Cited in the file of this patent

UNITED STATES PATENTS 2,278,473    Musher _____ Apr. 7, 1942

OTHER REFERENCES

"Coffee The Beverage," 1925, by Foot, The Spice Mill Publishing Co. (New York), p. 69.